Patented July 13, 1943

2,324,448

UNITED STATES PATENT OFFICE 2,324,448

METHOD AND PRODUCT FOR PRODUCING A CLEANSING AND PRESERVING COATING ON FRUITS AND VEGETABLES

Gottlieb Wehrli, Basel, Switzerland

No Drawing. Application March 8, 1939, Serial No. 260,528

3 Claims. (Cl. 99—168)

The preservation of fresh fruits has been described in various patents and "as such" is known. It consists essentially in covering the fruits by means of a mechanical equipment with a thin film-like coating mass. As coating substances waxes, resins, fats, paraffins, ceresins are used individually or in mixtures and in a liquid heated state, in solution with organic solvents or in form of emulsions and specific mechanical equipments are used for this purpose.

The known processes of this kind have several great disadvantages. Partly by the employment of heat and partly by the use of organic solvents not only the odor and the flavour of the fruits is impaired but also the durability will become lessened as the coating sealing the fruits hermetically and being rich in fats by preventing the biological respiratory process promotes the formation of mould and putrefaction.

Moreover, the carrying out of the known processes of these types involve the application of expensive machinery and of a plurality of operations for instance preliminary cleansing, drying, spraying, after-treatment, removing of fats, polishing, etc.

Proposals have been made to obviate these disadvantages partly by applying combinations of waxes and fats in form of aqueous emulsions whereby in particular the inconvenient excess of fat and the application of heat can be avoided. It has been found, however, that a satisfactory action of the coating highly depends upon the correct adjustment of the surface tension of the fruits to be treated said surface tension being subject as known, to very remarkable fluctuations so that it becomes necessary to determine for the various kinds of fruits by preliminary tests the adjustment of the appropriate surface tension. It is obvious that such methods are not suitable for practical purposes.

Thus, using an emulsion its unsufficient capacity of wetting will not produce a uniform coating and the liquid on drying often contracts in drops so that the protective coating is not coherent.

Thorough investigations have proven that all the above stated disadvantages and drawbacks can be eliminated by creating upon fruits and vegetables a cleansing and preserving coating by means of a colloidal suspension of gum-resins in addition with wetting agents and fatty alcohols whereby the surface tension is suppressed and a uniform wetting is obtained in one operation.

The essential feature of the invention therefore consists in eliminating in one operation entirely the surface tension by means of a wetting agent so that the wetting will become entirely uniform.

As wetting agents may be used besides sulphonic acid of ricinol and its salts wetting agents of the kind being known in the trade as nekal, leonyl, algosol, betan, brecolane, sapamine, etc. These materials are essentially high molecular sulphonic acids and their alkali salts.

A further advantage consists therein that by the use of wetting agents the process of providing a coating can be carried out very simply and does not necessitate any complicated and costly machinery. At the same time the wetting means have a high grade cleansing property.

In order to wash and to preserve simultaneously the various kinds of fruits or vegetables the same are simply dipped in the solution and then removed therefrom. Instead of dipping the goods in the solution they may also be sprinkled with the same. The drying take place in a very quick manner.

The addition of small quantities of borax or fluoric salts imparts to the liquid high grade antiseptic properties and prevents putrefaction.

Example 100 parts by weight of gum-lac and 50 parts by weight of gum-resin (cherry-gum, olibanum, myrrh or the like) are heated in an enamelled pot under continuous stirring at boiling temperature with one liter of water in which 20 grams of borax and 10 grams of ammonia of 10% is diluted; then 5 grams of cetylalcohol and 2 grams of a wetting agent, e. g. nekal or sapamine are added and the heating will be continued for some while until the liquid becomes homogeneous. After cooling the mass is filtered through a cloth or the like and the solution is ready for use.

Now the fruits or vegetables, respectively, will simply be dipped for a short time in the solution, then again removed and in the usual manner dried and, if desired, polished. Instead of dipping the articles they may also be sprinkled with the solution.

I claim:

1. A method of cleaning and coating fruits comprising admixing to an aqueous emulsion of a gum-resin at the boiling temperature and under continuous stirring a substance selected from the group consisting of aliphatic sulphonic acids and their salts and a fatty alcohol.

2. A method of producing a cleaning and coating solution for fruits comprising admixing to an aqueous emulsion containing about 100 parts by weight of a gum resin at the boiling temperature and under continuous stirring about two parts by weight of a substance selected from the group consisting of aliphatic sulphonic acids and their salts, and about five parts by weight of cetyl alcohol.

3. A cleansing and coating solution for fruits comprising a mixture consisting of an aqueous coloidal emulsion of gum resins of a substance selected from the group consisting of aliphatic sulphonic acids and their salts and of a fatty alcohol.

GOTTLIEB WEHRLI.